(12) United States Patent
Ono (10) Patent No.: US 9,581,050 B2
(45) Date of Patent: Feb. 28, 2017

(54) WASTE HEAT RECOVERY RANKING CYCLE SYSTEM

(71) Applicant: YANMAR CO., LTD., Osaka (JP)

(72) Inventor: Taisuke Ono, Osaka (JP)

(73) Assignee: YANMAR CO., LTD. (JP)

( * ) Notice: Subject to any disclaimer, the term of this patent is extended or adjusted under 35 U.S.C. 154(b) by 114 days.

(21) Appl. No.: 14/382,133

(22) PCT Filed: Feb. 28, 2013

(86) PCT No.: PCT/JP2013/055393
§ 371 (c)(1),
(2) Date: Nov. 24, 2014

(87) PCT Pub. No.: WO2013/129569
PCT Pub. Date: Sep. 6, 2013

(65) Prior Publication Data
US 2015/0218972 A1      Aug. 6, 2015

(30) Foreign Application Priority Data

Mar. 2, 2012 (JP) ................................ 2012-047349

(51) Int. Cl.
*F01K 23/04*   (2006.01)
*F01K 25/08*   (2006.01)
(Continued)

(52) U.S. Cl.
CPC .............. *F01K 23/04* (2013.01); *F01K 23/10* (2013.01); *F01K 25/065* (2013.01); *F01K 25/08* (2013.01);
(Continued)

(58) Field of Classification Search
CPC ....................................................... F01K 23/04
(Continued)

(56) References Cited

U.S. PATENT DOCUMENTS 4,037,413 A * 7/1977 Heller .................... F01K 23/02
60/655
4,120,158 A * 10/1978 Sheinbaum ........... F01K 21/005
60/641.3
(Continued)

FOREIGN PATENT DOCUMENTS

JP      H09209716 A      8/1997
JP      2005282363 A    10/2005
(Continued)

OTHER PUBLICATIONS

International Search Report for International Application No. PCT/JP2013/055393; Date of Mailing, May 7, 2013; with English translation.

*Primary Examiner* — Thomas Denion
*Assistant Examiner* — Mickey France
(74) *Attorney, Agent, or Firm* — Cantor Colburn LLP (57) ABSTRACT

A waste heat recovery Rankine cycle system has a first Rankine cycle operated with a first working medium and a second Rankine cycle operated with a second working medium having a lower boiling point than the first working medium, the first Rankine cycle has a second scroll type fluid machine as an expander, a second electric generator, a second condenser, a condensing tank, a second condensing pump, a gas-liquid separation device, a heat exchanger, a low rate regulation valve, and a control device. This structure can drive a generator by a waste heat not only in a first Rankine cycle but also in a second Rankine cycle.

3 Claims, 6 Drawing Sheets

(51) Int. Cl.
*F01K 23/10* (2006.01)
*F01K 25/06* (2006.01)
*F02G 5/02* (2006.01)

(52) U.S. Cl.
CPC ................. *F02G 5/02* (2013.01); *Y02E 20/14* (2013.01); *Y02T 10/166* (2013.01)

(58) Field of Classification Search
USPC .................................. 60/618, 655, 670, 671
See application file for complete search history.

(56) References Cited

U.S. PATENT DOCUMENTS

| | | | |
|---|---|---|---|
| 5,754,613 A | 5/1998 | Hashiguchi et al. | |
| 2008/0168772 A1* | 7/2008 | Radcliff | F01K 25/08 60/651 |
| 2010/0294217 A1 | 11/2010 | Kasuya et al. | |
| 2010/0295306 A1* | 11/2010 | Ridnik | F03G 6/005 290/52 |
| 2011/0016863 A1* | 1/2011 | Ernst | F01K 25/10 60/645 |

FOREIGN PATENT DOCUMENTS

| | | |
|---|---|---|
| JP | 4140544 B2 | 6/2008 |
| JP | 2008202474 A | 9/2008 |
| JP | 2008267341 A | 11/2008 |
| WO | 2009093549 A1 | 7/2009 |

* cited by examiner

WASTE HEAT RECOVERY RANKING CYCLE SYSTEM

This is the U.S. national stage of application No. PCT/JP2013/055393, filed on Feb. 28, 2013. Priority under 35 U.S.C. §119(a) and 35 U.S.C. §365(b) is claimed from Japanese Application No. 2012-047349 filed Mar. 2, 2012, the disclosure of which is also incorporated herein by reference.

TECHNICAL FIELD

The present invention relates to a waste heat recovery Rankine cycle system.

BACKGROUND ART

Conventionally, a waste heat recovery Rankine cycle system is known in which waste heat radiated from a heat source such as an engine is collected so as to generate steam with high temperature and high pressure, and an expander is driven with the steam as a working medium so as to generate electric power. Among such waste heat recovery Rankine cycle systems, there is a system configured by combining a first Rankine cycle operated with water vapor (water) as a working medium and a second Rankine cycle operated with a material having lower boiling point than the water as a working medium. The steam of the second working medium is generated with the water vapor which is the first working medium as the heat source, and the electric power is generated again with the steam. By reusing the first working medium as the heat source heating the second working medium, efficiency of electric power generation is improved. For example, the art described in the Patent Literature 1 is so.

CITATION LIST

Patent Literature

Patent Literature 1: the Japanese Patent Laid Open Gazette 2008-267341

SUMMARY OF INVENTION

Problems to be Solved by the Invention

However, in the art described in the Patent Literature 1, when the heat of the second working medium is used further, the second working medium after used as a drive source of a second expander is used as a heat source of a third Rankine cycle. Accordingly, a workload of the second expander with the second working medium is proportional to a heat amount supplied to a third working medium in a second condenser. Namely, a ratio between the workload outputted at the second expander and the heat amount radiated at the second condenser cannot be changed, whereby a heat amount corresponding to heat demand from the third Rankine cycle may be unable to be supplied.

The present invention is provided in consideration of the conditions as mentioned above, and the purpose of the invention is to provide a waste heat recovery Rankine cycle system in which waste heat is collected efficiently as a mode corresponding to heat demand.

Means for Solving the Problems

According to the present invention, a waste heat recovery Rankine cycle system includes a first Rankine cycle operated with a first working medium, and a second Rankine cycle operated with a second working medium having lower boiling point than the first working medium. The first Rankine cycle has a first condenser in which the first working medium is condensed by the second working medium. The second Rankine cycle has a condensing pump supplying the second working medium to the first condenser, a regulation valve changing a flow rate of the condensing pump, and a gas-liquid separation device which separates the second working medium, heated in the first condenser, into a vapor phase and a liquid phase. The vapor phase of the second working medium is supplied to the expander and the liquid phase of the second working medium is supplied to the heat exchanger.

According to the present invention, the waste heat recovery Rankine cycle system further includes a control device. When an amount of heat exchanged between feed water supplied to the heat exchanger and the second working medium is increased, a driving state of the condensing pump and an opening degree of the regulation valve are controlled so as to increase a flow rate of the second working medium. When the amount of heat exchanged between the feed water supplied to the heat exchanger and the second working medium is reduced, the driving state of the condensing pump and the opening degree of the regulation valve are controlled so as to reduce the flow rate of the second working medium.

According to the present invention, the waste heat recovery Rankine cycle system further includes a liquid level detection means detecting a liquid level which is a limit of separation of the vapor phase from the second working medium by the gas-liquid separation device. When the liquid level detection means detects the liquid level, the control device controls the driving state of the condensing pump and the opening degree of the regulation valve so as to increase the flow rate of the second working medium.

According to the present invention, the waste heat recovery Rankine cycle system further includes a second condenser in which the second working medium discharged from the expander is condensed by the cooling water, and a switching valve which changes a route of the cooling water so as to supply the cooling water instead of the feed water to an instrument to which the feed water is supplied. When an amount of heat exchanged between the feed water and the second working medium per unit flow rate of the feed water is not more than an amount of heat exchanged between the cooling water and the second working medium per unit flow rate of the cooling water in the second condenser, the control device switches the switching valve so as to supply the cooling water to the instrument to which the feed water is supplied.

Effect of the Invention

The present invention brings the following effects.

According to the present invention, in the second Rankine cycle, the waste heat can be collected as not only power of the expander but also heat for heating the feed water. Accordingly, the waste heat is collected efficiently as a mode corresponding to the heat demand.

According to the present invention, by changing the flow rate of the second working medium so as to change the ratio of the vapor phase and the liquid phase of the second working medium, the ratio of workload of the expander and the heat amount exchanged in the heat exchanger can be changed. Accordingly, the waste heat is collected efficiently as a mode corresponding to the heat demand.

According to the present invention, the vapor phase is prevented from being supplied to the heat exchanger. Accordingly, efficiency of the heat exchanger is not reduced.

According to the present invention, when the heat demand is small, all the second working medium can be supplied to the expander while heat is supplied to the instrument to which the feed water is supplied. Accordingly, the waste heat is collected efficiently as a mode corresponding to the heat demand.

DETAILED DESCRIPTION OF THE INVENTION

The mode for carrying out the invention is explained referring to drawings.

Firstly, an explanation will be given on a configuration of a waste heat recovery Rankine cycle system 1 having a scroll type fluid machine according to a first embodiment of the present invention referring to FIG. 1.

Figure 1:
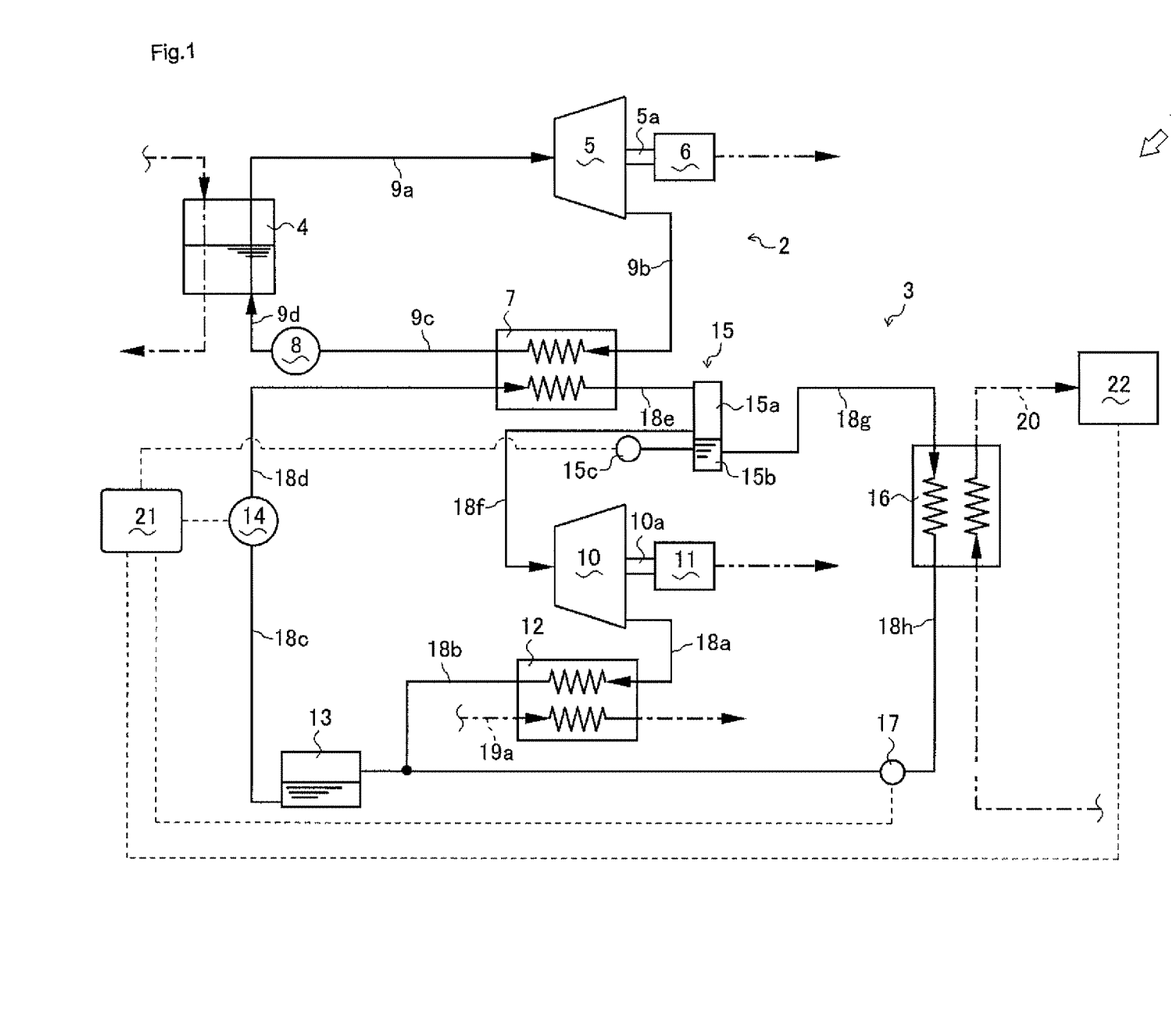
FIG. 1 is a schematic drawing of a waste heat recovery Rankine cycle system which is a first embodiment of the present invention.

As shown in FIG. 1, the waste heat recovery Rankine cycle system 1 is a thermoelectric supply system which generates electric power and supplies heat in parallel with exhaust gas from an engine or the like as a heat source. As shown in FIG. 1, the waste heat recovery Rankine cycle system 1 has a first Rankine cycle 2 operated with a first working medium, and a second Rankine cycle 3 operated with a second working medium having lower boiling point than the first working medium.

The first Rankine cycle 2 generates electric power with the first working medium heated by an external heat source. The first Rankine cycle 2 has a steam generator 4, a first scroll type fluid machine 5 which is an expander, a first electric generator 6, a first condenser 7 and a first condensing pump 8.

The steam generator 4 generates steam with high temperature and high pressure by heating the first working medium. The steam generator 4 includes a waste heat recovery boiler whose heat source is the exhaust gas of the engine. The steam generator 4 generates the steam by heat exchange between the first working medium and the exhaust gas. The steam generator 4 is connected via a working medium passage 9a to the first scroll type fluid machine 5. The steam generated by the steam generator 4 is supplied via the working medium passage 9a to the first scroll type fluid machine 5. Though the heat source is the exhaust gas of the engine in this embodiment, the heat source is not limited thereto.

The first scroll type fluid machine 5 which is the expander exchanges energy of the steam into rotational power and outputs it. The first scroll type fluid machine 5 is connected via a working medium passage 9b to the first condenser 7. The first working medium is supplied as vapor phase (steam) from the steam generator 4 to an expansion chamber (not shown) formed in the first scroll type fluid machine 5, and adiabatic expansion is performed so as to rotate a crankshaft 5a. Though the expander is scroll type in this embodiment, the expander is not limited thereto and may alternatively be turbine type.

The first electric generator 6 generates electric power by driving power from the outside. The first electric generator 6 is connected to the crankshaft 5a of the first scroll type fluid machine 5. Namely, the first electric generator 6 can generate electric power by rotation of the crankshaft 5a. The electric power generated by the first electric generator 6 is supplied to the outside of the waste heat recovery Rankine cycle system 1.

The first condenser 7 cools and condenses (resurrects) the steam which is the vapor phase of the first working medium. The first condenser 7 is connected via a working medium passage 9c to the first condensing pump 8. The first working medium is supplied from the first scroll type fluid machine 5 via the working medium passage 9b to the first condenser 7. The second working medium is supplied via a working medium passage 18d of the second Rankine cycle 3 to the first condenser 7. The first condenser 7 condenses the first working medium by heat exchange between the first working medium and the second working medium. Namely, the first condenser 7 condenses the first working medium with the second working medium of the second Rankine cycle 3 as a coolant. On the other hand, the second working medium is heated by the heat exchange with the first working medium.

The first condensing pump 8 supplies the first working medium to the steam generator 4. The first condensing pump 8 is connected via a working medium passage 9d to the steam generator 4. The first working medium condensed in the first condenser 7 is supplied to the steam generator 4 by the first condensing pump 8.

The second Rankine cycle 3 generates electric power and supplies heat with the second working medium heated by the first working medium as a heat source. The second Rankine cycle 3 has a second scroll type fluid machine 10 which is an expander, a second electric generator 11, a second condenser 12, a condensing tank 13, a second condensing pump 14, a gas-liquid separation device 15, a heat exchanger 16, a flow rate regulation valve 17, and a control device 21.

The second scroll type fluid machine 10 which is the expander exchanges energy of the steam into rotational power and outputs it. The second scroll type fluid machine 10 is connected via a working medium passage 18a to the second condenser 12. The second working medium is heated in the first condenser 7, and vapor phase (steam) of the second working medium separated by the gas-liquid separation device 15 is supplied to the second scroll type fluid machine 10. The second working medium is supplied to an expansion chamber (not shown) formed in the second scroll type fluid machine 10, and adiabatic expansion is performed so as to rotate a crankshaft 10a. Though the expander is scroll type in this embodiment, the expander is not limited thereto and may alternatively be turbine type.

The second electric generator 11 generates electric power by driving power from the outside. The second electric generator 11 is connected to the crankshaft 10a of the second scroll type fluid machine 10. Namely, the second electric generator 11 can generate electric power by rotation of the crankshaft 10a. The electric power generated by the second electric generator 11 is supplied to the outside of the waste heat recovery Rankine cycle system 1.

The second condenser 12 cools and condenses (resurrects) the steam which is the vapor phase of the second working medium. The second condenser 12 is connected via a working medium passage 18b to the condensing tank 13. The second working medium is supplied from the second scroll type fluid machine 10 via the working medium passage 18a to the second condenser 12. Cooling water is supplied via a cooling water passage 19a to the second condenser 12. The second condenser 12 condenses the second working medium by heat exchange between the second working medium and the cooling water. The second working medium condensed in the second condenser 12 is supplied via the working medium passage 18b to the condensing tank 13.

The condensing tank 13 stores the second working medium condensed by the second condenser 12. The condensing tank 13 is connected via a working medium passage 18c to the second condensing pump 14.

The second condensing pump 14 supplies the second working medium to the first condenser 7 of the first Rankine cycle 2. A flow rate per unit time of the second condensing pump 14 can be changed optionally. The second condensing pump 14 is connected via the working medium passage 18d to the first condenser 7. The second working medium in the condensing tank 13 is supplied to the first condenser 7 by the second condensing pump 14. Namely, heat is supplied to the second working medium from the first working medium in the first condenser 7.

The gas-liquid separation device 15 separates the second working medium into vapor phase (steam) and liquid phase. The gas-liquid separation device 15 includes a vapor phase holding part 15a and a liquid phase holding part 15b. The gas-liquid separation device 15 is connected via a working medium passage 18e to the first condenser 7. Accordingly, the second working medium, which is heated in the first condenser 7 so as to include the vapor phase and the liquid phase, is supplied to the gas-liquid separation device 15. The vapor phase holding part 15a of the gas-liquid separation device 15 is connected via a working medium passage 18f to the second scroll type fluid machine 10. Furthermore, the liquid phase holding part 15b of the gas-liquid separation device 15 is connected via a working medium passage 18g to the heat exchanger 16. Accordingly, the vapor phase of the second working medium is supplied to the second scroll type fluid machine 10, and the liquid phase of the second working medium is supplied to the heat exchanger 16.

The heat exchanger 16 performs heat exchange between the second working medium and a cooling medium. The heat exchanger 16 is connected via a working medium passage 18h to the condensing tank 13. The heat exchanger 16 is connected via a water supply passage 20 to an external thermal instrument group 22 as the cooling medium. The second working medium as the liquid phase is supplied via the working medium passage 18g to the heat exchanger 16.

The heat exchanger 16 performs heat exchange between the second working medium and feed water so as to cool the second working medium and heat the feed water.

The flow rate regulation valve 17 controls the flow rate of the second working medium. The flow rate regulation valve 17 is provided in the working medium passage 18h. The flow rate regulation valve 17 can set an opening degree of a valve optionally. Namely, the flow rate regulation valve 17 can change optionally a flow rate per unit time of fluid passing therethrough.

The control device 21 controls the waste heat recovery Rankine cycle system 1 based on heat demand. Various programs and data for controlling the waste heat recovery Rankine cycle system 1 are stored in the control device 21. The control device 21 may be configured by connecting a CPU, a ROM, a RAM, a HDD and the like with a bus or may alternatively be a one-chip LSI or the like.

The control device 21 is connected to the external thermal instrument group 22 so as to obtain information about the heat demand from the external thermal instrument group 22. The control device 21 is connected to various devices constituting the waste heat recovery Rankine cycle system 1, for example the second condensing pump 14 and the flow rate regulation valve 17. The control device 21 can control the flow rate per unit time of the second working medium supplied by the second condensing pump 14. The control device 21 can control an opening degree of the flow rate regulation valve 17.

In the waste heat recovery Rankine cycle system 1 constructed as the above, the first Rankine cycle 2 is used for driving the first scroll type fluid machine 5 with the first working medium heated by the steam generator 4. The first working medium discharged from the first scroll type fluid machine 5 is condensed by the first condenser 7 and then supplied to the steam generator 4. In the second Rankine cycle 3, the second working medium is heated by the heat exchange with the first working medium in the first condenser 7. The second working medium is separated into the vapor phase (steam) and the liquid phase by the gas-liquid separation device 15. The vapor phase of the second working medium is used for driving the second scroll type fluid machine 10. The liquid phase of the second working medium is supplied to the heat exchanger 16 and used for cooling the feed water. Accordingly, the electric power is generated by the first working medium, and the electric power is generated and the heat is supplied by the second working medium.

Next, an explanation will be given on phase change of the second working medium in the waste heat recovery Rankine cycle system 1 referring to FIGS. 1 and 2.

Figure 2:
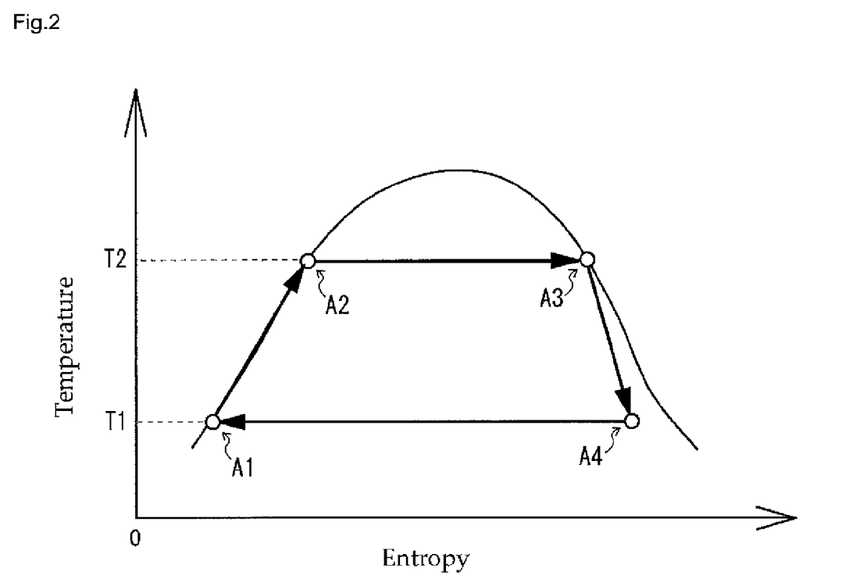
FIG. 2 is a diagram of phase change of a working medium in the waste heat recovery Rankine cycle system of the present invention.

FIG. 2 is a T-S diagram (temperature-entropy diagram) of this embodiment. Arrows in the diagram show a Rankine cycle of the second working medium.

As shown in FIGS. 1 and 2, a temperature T1 is an inlet temperature of the first condenser 7 and a temperature T2 is a steam temperature of the second working medium. A point A1 is a state of the second working medium at an inlet of the first condenser 7. A point A2 is a start point of generation of the steam in the first condenser 7. A point A3 is a state of the second working medium at an outlet of the first condenser 7. A point A4 is a state of the second working medium at a steam discharge port of the second scroll type fluid machine 10.

Between the points A1 and A2, the second working medium exists as the liquid phase, and is heated and pressurized by the steam generator 4. Then, at the state of the point A2, the second working medium starts phase change from the liquid phase to the vapor phase (steam).

Between the points A2 and A3, the second working medium is heated and pressurized further by the steam generator 4. Between the points, the second working medium has both the liquid phase and the vapor phase. At the point A3, the phase change of the second working medium to the vapor phase is finished.

Between the points A3 and A4, the second working medium works while expanding in the expansion chamber of the second scroll type fluid machine 10. The expansion of the second working medium in the expansion chamber is approximate adiabatic expansion, whereby the temperature of the second working medium is reduced. Between the points, a part of the second working medium is condensed and starts phase change from the vapor phase to the liquid phase.

Between the points A4 and A1, the second working medium is cooled by the second condenser 12 and condensed at a fixed pressure. Between the points, the second working medium starts the phase change from the vapor phase to the liquid phase. As a result, at the point A1, the phase change of the second working medium to the liquid phase is finished.

Next, an explanation will be given on an operation mode of the second condensing pump 14 in the second Rankine cycle 3 referring to FIGS. 1 to 3.

As shown in FIG. 1, the second working medium is supplied to the first condenser 7 by the second condensing pump 14. At this time, a heat supply amount per unit flow rate from the first working medium to the second working medium is reduced following increase of a flow rate per unit time of the second working medium determined by a driving state of the second condensing pump 14 and the opening degree of the flow rate regulation valve 17 (hereinafter, simply referred to as "flow rate F"). Namely, a phase state of the second working medium is determined by the flow rate F of the second working medium.

Figure 3:
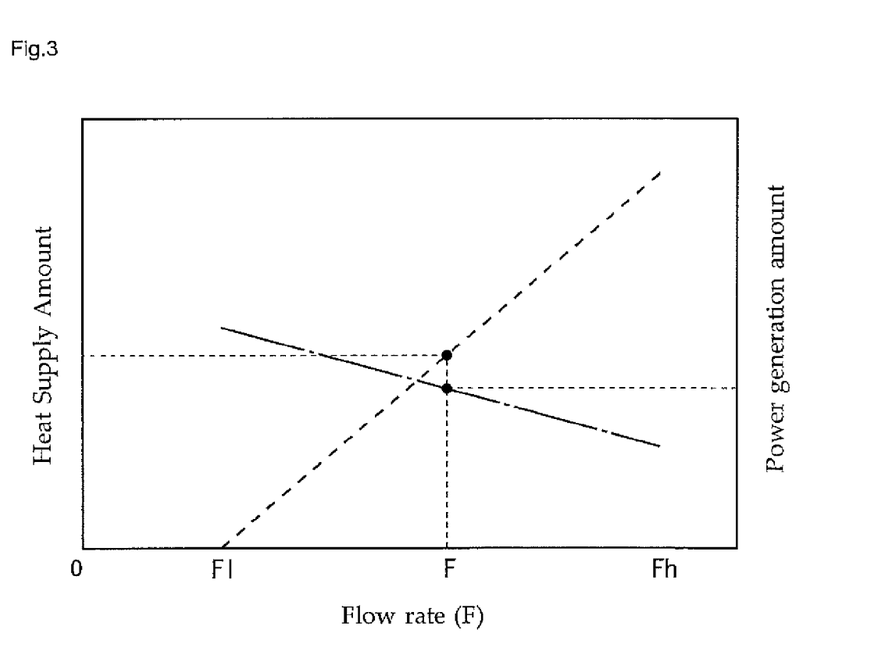
FIG. 3 is a diagram of relation of heat supply amount and electric power generation amount concerning flow rate per unit time of a second working medium of the waste heat recovery Rankine cycle system which is the first embodiment of the present invention.

As shown in FIG. 3, when the flow rate F of the second working medium is less than a flow rate Fl, all the second working medium is phase-changed to the steam which is the vapor phase by the heat from the first working medium in the first condenser 7. Namely, the second working medium is phase-changed from the state of the point A1 to the state of the point A3 in FIG. 2 and discharged from the first condenser 7. All the second working medium which is the vapor phase is supplied to the second scroll type fluid machine 10 by the gas-liquid separation device 15. As a result, in the second Rankine cycle 3, the electric power is generated by the second scroll type fluid machine 10, and heat is not supplied to the feed water by the heat exchanger 16.

As shown in FIG. 3, when the flow rate F of the second working medium is not less than the flow rate Fl and less than a flow rate Fh, following reduction of the heat supply amount per unit flow rate of the second working medium supplied from the first working medium to the second working medium in the first condenser 7, a part of the second working medium is phase-changed to the vapor phase. Namely, the second working medium is phase-changed from the state of the point A1 to the state between the points A2 and A3 corresponding to the flow rate F in FIG. 2 and discharged from the first condenser 7. Concretely, when the flow rate F of the second working medium is the flow rate Fl, most of the second working medium is phase-changed to the vapor phase. When the flow rate F of the second working medium is between the flow rate Fl and the flow rate Fh, a rate in response to the flow rate F of the second working medium is phase-changed to the vapor phase. Namely, the vapor phase and the liquid phase are intermingled at the rate in response to the flow rate F. When the flow rate F of the second working medium is near the flow rate Fh, most of the second working medium is the liquid phase and a tiny part thereof is phase-changed to the vapor phase.

The second working medium which exists as the vapor phase is supplied to the second scroll type fluid machine 10 by the gas-liquid separation device 15. As a result, in the second Rankine cycle 3, the electric power is generated by the second scroll type fluid machine 10. On the other hand, the second working medium which exists as the liquid phase is supplied to the heat exchanger 16 by the gas-liquid separation device 15. As a result, in the second Rankine cycle 3, heat is supplied from the second working medium to the feed water in the heat exchanger 16.

As shown in FIG. 3, when the flow rate F of the second working medium is larger than the flow rate Fh, the second working medium is not phase-changed to the steam which is the vapor phase with the heat supply amount per unit flow rate of the second working medium supplied from the first working medium to the second working medium in the first condenser 7, and is still the liquid phase. Namely, the second working medium is discharged from the first condenser 7 while at the state of the point A2 which is not accompanied by the phase change from the state of the point A1 in FIG. 2. All the second working medium which is the liquid phase is supplied to the heat exchanger 16 by the gas-liquid separation device 15. As a result, in the second Rankine cycle 3, the heat is supplied from the second working medium to the feed water in the heat exchanger 16, and the electric power is not generated by the second scroll type fluid machine 10.

Accordingly, in the second Rankine cycle 3, by changing the flow rate F of the second working medium, a ratio of the electric power generation amount and the heat amount supplied to the feed water.

An explanation will be given on an operation mode of the control device 21 of the waste heat recovery Rankine cycle system 1 configured as the above referring to FIG. 4.

The control device 21 obtains the information about the heat demand from the external thermal instrument group 22. Based on the obtained information, the control device 21 controls the flow rate F of the second working medium supplied by the second condensing pump 14 and the opening degree of the flow rate regulation valve 17 (see FIG. 1).

Figure 4:
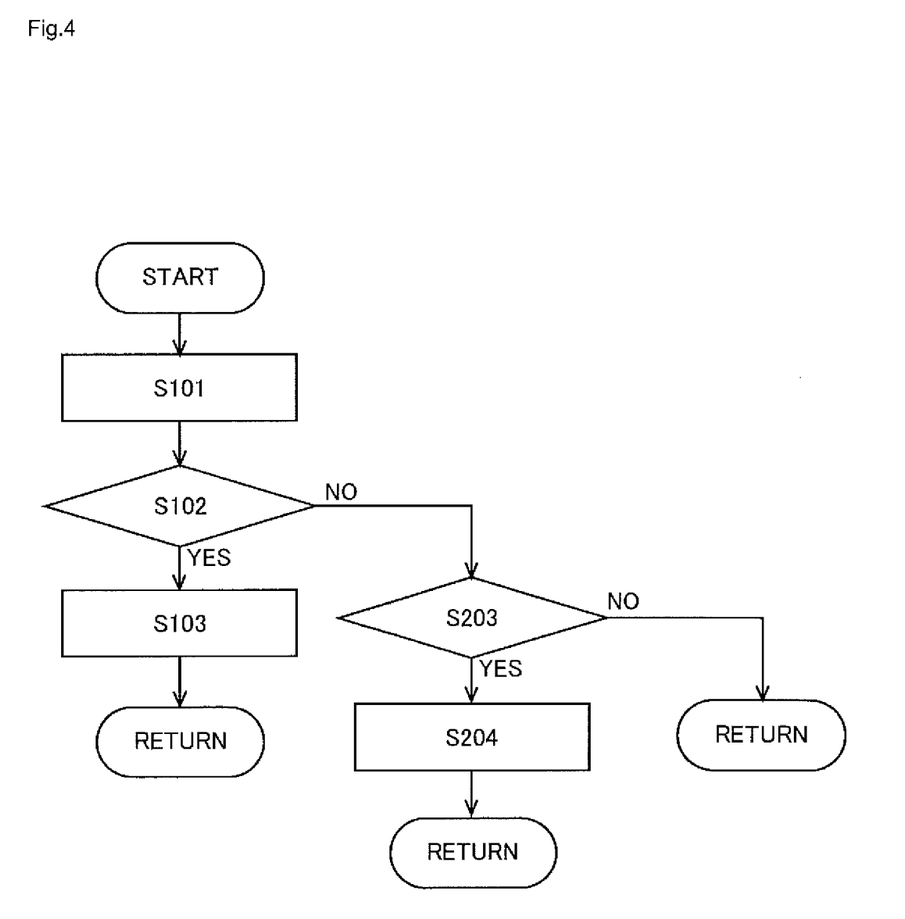
FIG. 4 is a flow chart of control steps of a second condensing pump of the waste heat recovery Rankine cycle system which is the first embodiment of the present invention.

As shown in FIG. 4, the control device 21 controls the second condensing pump 14 with below steps.

Firstly, at a step S101, the control device 21 obtains the information about the heat demand from the external thermal instrument group 22 connected to the control device 21 and the flow rate F of the second working medium.

At a step S102, on the basis of the information about the heat demand from the external thermal instrument group 22, the control device 21 judges whether the flow rate F of the second working medium is larger than a target flow rate Ft based on the heat demand or not. Namely, it is judged whether the heat supply amount per unit time of the feed water from the second working medium, which is the liquid phase not phase-changed to the vapor phase in the first condenser 7, to the feed water is larger than the heat demand from the external thermal instrument group 22 or not.

As a result, when the flow rate F of the second working medium supplied by the second condensing pump 14 is judged larger than the target flow rate Ft based on the heat demand, that is, when the heat supply amount per unit time of the feed water from the second working medium by the heat exchange is judged larger than the heat demand from the external thermal instrument group 22, the control device 21 shifts the steps to a step S103.

On the other hand, when the flow rate F of the second working medium is judged not larger than the target flow rate Ft based on the heat demand, that is, when the heat supply amount per unit time of the feed water from the second working medium by the heat exchange is judged not larger than the heat demand from the external thermal instrument group 22, the control device 21 shifts the steps to a step S203.

At the step S103, the control device 21 controls the driving state of the second condensing pump 14 and the opening degree of the flow rate regulation valve 17 so as to reduce the flow rate F of the second working medium to the target flow rate Ft. Accordingly, the heat supply amount per unit time of the feed water by the heat exchanger 16 is reduced. On the other hand, the flow rate of the second working medium which is phase-changed to the vapor phase by the heat exchange in the first condenser 7 is increased. Accordingly, the second working medium supplied to the second scroll type fluid machine 10 is increased, and the electric power generation amount by the second electric generator 11 is increased. Subsequently, the control device 21 returns the steps to the step S101.

At the step S203, on the basis of the information about the heat demand from the external thermal instrument group 22, the control device 21 judges whether the flow rate F of the second working medium is smaller than a target flow rate Ft based on the heat demand or not. Namely, it is judged whether the heat supply amount per unit time of the feed water from the second working medium, which is not phase-changed to the vapor phase in the first condenser 7, to the feed water is smaller than the heat demand from the external thermal instrument group 22 or not.

As a result, when the flow rate F of the second working medium is judged smaller than the target flow rate Ft based on the heat demand, that is, when the heat supply amount per unit time of the feed water from the second working medium by the heat exchange is judged larger than the heat demand from the external thermal instrument group 22, the control device 21 shifts the steps to a step S204.

On the other hand, when the flow rate F of the second working medium is judged not smaller than the target flow rate Ft based on the heat demand, that is, when the heat supply amount per unit time of the feed water from the second working medium by the heat exchange is judged not smaller than the heat demand from the external thermal instrument group 22, the control device 21 returns the steps to the step S101.

At the step S204, the control device 21 controls the driving state of the second condensing pump 14 and the opening degree of the flow rate regulation valve 17 so as to increase the flow rate F of the second working medium to the target flow rate Ft. Accordingly, the heat supply amount per unit time of the feed water by the heat exchanger 16 is increased. On the other hand, the flow rate of the second working medium which is phase-changed to the vapor phase by the heat exchange in the first condenser 7 is reduced. Accordingly, the second working medium supplied to the second scroll type fluid machine 10 is reduced, and the electric power generation amount by the second electric generator 11 is reduced. Subsequently, the control device 21 returns the steps to the step S101.

As another embodiment of the waste heat recovery Rankine cycle system 1 in this embodiment, there is a configuration in which a liquid level detection sensor 15c, which is a liquid level detection means, is provided in the gas-liquid separation device 15. The liquid level detection sensor 15c detects a liquid level of the second working medium which is the liquid phase separated in the gas-liquid separation device 15. The liquid level detection sensor 15c is connected to the control device 21 (see FIG. 1). The control device 21 can obtain a liquid level signal S about the liquid level of the second working medium detected by the liquid level detection sensor 15c.

Figure 5:
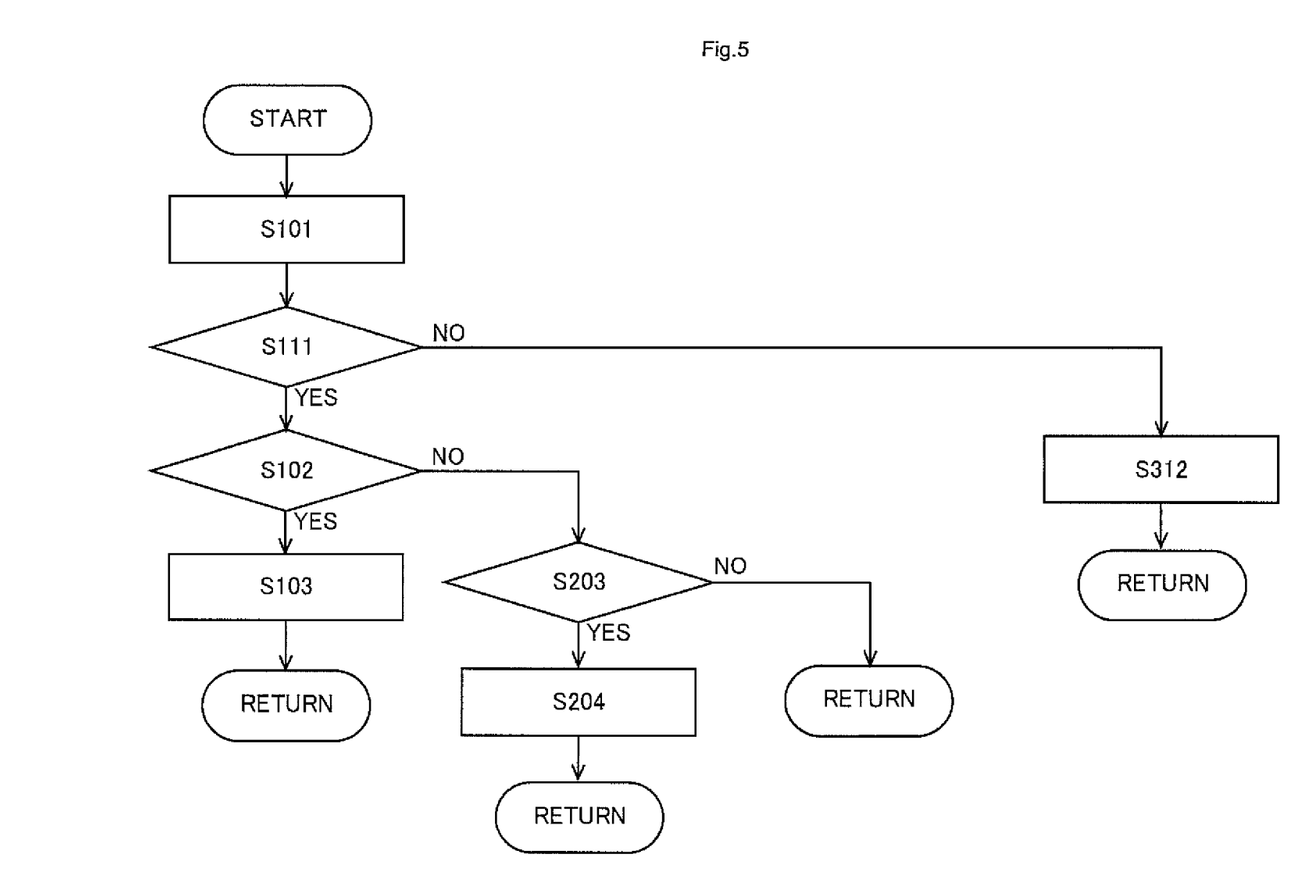
FIG. 5 is a flow chart of control steps of a second condensing pump of a waste heat recovery Rankine cycle system which is another embodiment of the present invention.

An explanation will be given on an operation mode of the control device 21 of the waste heat recovery Rankine cycle system 1 in which the liquid level detection sensor 15c is provided as the above referring to FIG. 5.

Firstly, at a step S101, the control device 21 obtains the information about the heat demand from the external thermal instrument group 22 connected to the control device 21, the flow rate F of the second working medium determined from the driving state of the second condensing pump 14 and the opening degree of the flow rate regulation valve 17, and the liquid level signal S about the liquid level of the second working medium in the gas-liquid separation device 15 from the liquid level detection sensor 15c.

At a step S111, the control device 21 judges whether the liquid level signal S is higher than a liquid level Sl which is a limit of separation of the steam by the gas-liquid separation device 15. Namely, it is judged whether the liquid level signal S is a liquid level at which the second working medium, which is the vapor phase, is not supplied from the gas-liquid separation device 15 to the heat exchanger 16 or not.

As a result, when the liquid level signal S is judged higher than the liquid level Sl, that is, the second working medium which is the vapor phase is judged not to be supplied to the heat exchanger 16, the control device 21 shifts the steps to the step S102.

On the other hand, when the liquid level signal S is judged not higher than the liquid level Sl, that is, the second working medium which is the vapor phase is judged to be supplied to the heat exchanger 16, the control device 21 shifts the steps to a step S312.

At the step S312, the control device 21 controls the second condensing pump 14 so as to increase the flow rate F of the second working medium for a predetermined amount. Namely, the control device 21 controls the second condensing pump 14 so as to raise the liquid level of the second working medium in the gas-liquid separation device 15. Subsequently, the control device 21 returns the steps to the step S101.

The steps S102 to S204 are the same as the embodiments explained above, and a concrete explanation thereof is omitted.

The operation mode of the waste heat recovery Rankine cycle system 1 according to this embodiment has been explained above. The application of the technical ideas of the present invention is not limited to the above-mentioned scroll type fluid machine and may alternatively be applied on a scroll type fluid machine with another configuration Additionally, the waste heat recovery Rankine cycle system 1 can be used for a ship which obtains propulsion power with high-temperature steam for example. The scroll type fluid machine can be used as a power machine which collects waste heat from other instruments and exchanges it into rotation power.

As the above, the waste heat recovery Rankine cycle system 1 includes the first Rankine cycle 2 operated with the first working medium and the second Rankine cycle 3 operated with the second working medium having lower boiling point than the first working medium. The first Rankine cycle 2 has the first condenser 7 in which the steam of the first working medium is condensed by the second working medium. The second Rankine cycle 3 has the second condensing pump 14 which is a condensing pump supplying the second working medium to the first condenser 7, the flow rate regulation valve 17 changing the flow rate of the second condensing pump 14, and the gas-liquid separation device 15 which separates the second working medium, heated in the first condenser 7, into the vapor phase and the liquid phase. The vapor phase of the second working medium is supplied to the expander and the liquid phase of the second working medium is supplied to the heat exchanger 16.

According to the configuration, in the second Rankine cycle 3, the waste heat can be collected as not only power of the expander but also heat for heating the feed water. Accordingly, the waste heat is collected efficiently as a mode corresponding to the heat demand.

The waste heat recovery Rankine cycle system 1 further includes the control device 21. When the amount of heat exchanged between the feed water supplied to the heat exchanger 16 and the second working medium is increased, the driving state of the condensing pump and the opening degree of the flow rate regulation valve 17 are controlled so as to increase the flow rate of the second working medium. When the amount of heat exchanged between the feed water supplied to the heat exchanger 16 and the second working medium is reduced, the driving state of the condensing pump and the opening degree of the flow rate regulation valve 17 are controlled so as to reduce the flow rate of the second working medium.

According to the configuration, by changing the flow rate F of the second working medium so as to change the ratio of the vapor phase and the liquid phase of the second working medium, the ratio of workload of the second scroll type fluid machine 10 and the heat amount discharged in the heat exchanger 16 can be changed. Accordingly, the waste heat is collected efficiently as a mode corresponding to the heat demand.

The waste heat recovery Rankine cycle system 1 further includes the liquid level detection means detecting the liquid level which is the limit of separation of the vapor phase from the second working medium by the gas-liquid separation device 15. When the liquid level detection means detects the liquid level, the control device 21 controls the driving state of the condensing pump and the opening degree of the flow rate regulation valve 17 so as to increase the flow rate of the second working medium.

According to the configuration, the steam is prevented from being supplied to the heat exchanger 16. Accordingly, efficiency of the heat exchanger 16 is not reduced.

Figure 6:
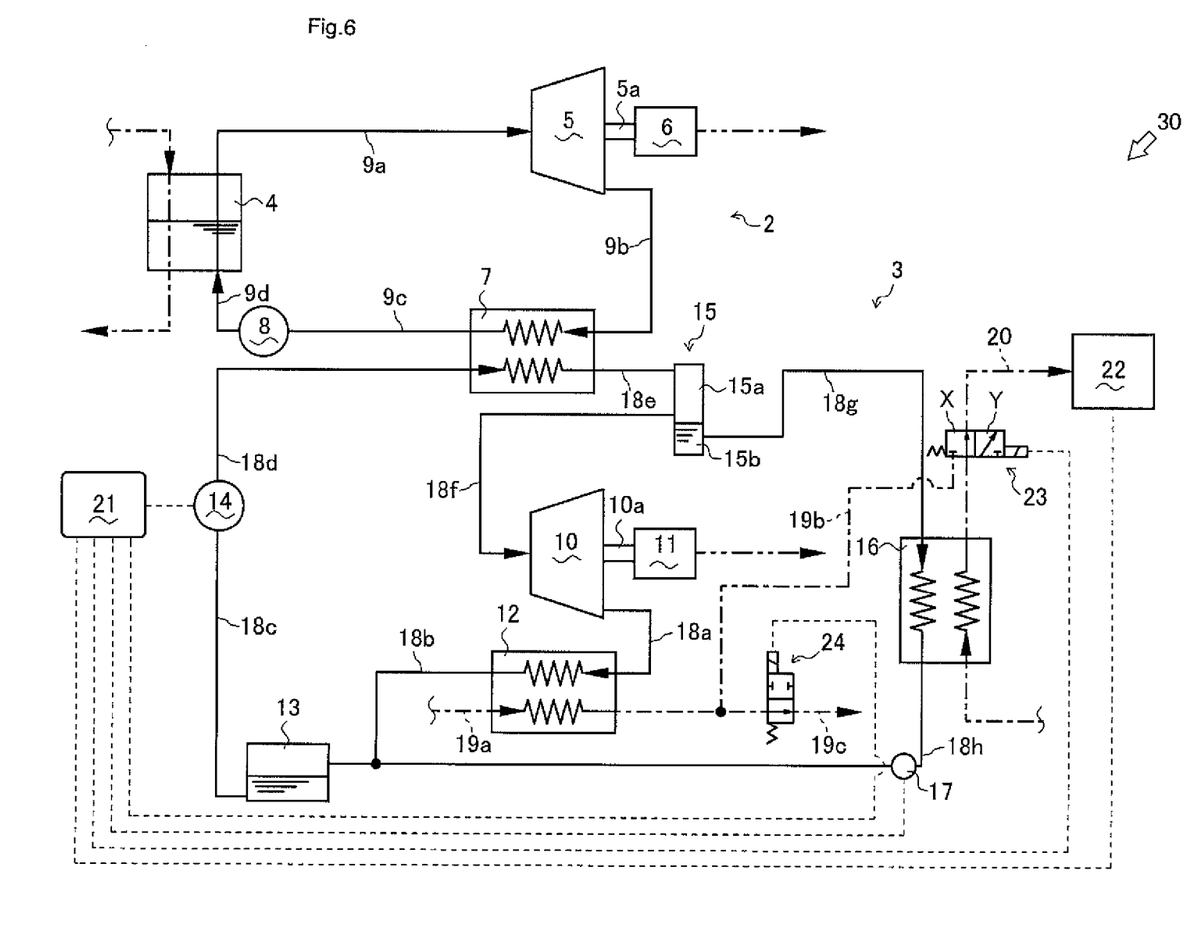
FIG. 6 is a schematic drawing of a waste heat recovery Rankine cycle system which is a second embodiment of the present invention.

An explanation will be given on a configuration of a waste heat recovery Rankine cycle system 30 which is a second embodiment of the waste heat recovery Rankine cycle system 1 referring to FIG. 6. In below embodiment, concrete explanations of points the same as the embodiments explained above are omitted, and points different from the above embodiments are mainly explained.

In addition to the members included in the waste heat recovery Rankine cycle system 1, the waste heat recovery Rankine cycle system 30 further has a switching valve 23 for switching the water supply passage so as to supply water to the second condenser 12.

The switching valve 23 switches the water supply passage 20. The switching valve 23 is provided in the water supply passage 20. The switching valve 23 is connected to a cooling water passage 19b. The switching valve 23 can be switched to a position X and a position Y by sliding a spool. A cooling water valve 24 which cuts off the cooling water passage is provided in to a cooling water passage 19c.

When the switching valve 23 is at the position X, the cooling water passage 19b is cut off from the water supply passage 20. Accordingly, the feed water is supplied to the water supply passage 20 and the cooling water is not supplied thereto. At this time, the cooling water valve 24 does not cut off the cooling water passage 19c and the cooling water is discharged via the cooling water valve 24 to the outside.

When the switching valve 23 is at the position Y, the cooling water passage 19b is communicated with the water supply passage 20. Accordingly, the feed water is not supplied to the water supply passage 20 and the cooling water is supplied thereto. At this time, the cooling water valve 24 cuts off the cooling water passage 19c and the cooling water is not discharged via the cooling water valve 24 to the outside.

The control device 21 is connected to the external thermal instrument group 22 so as to obtain information about the heat demand from the external thermal instrument group 22. The control device 21 is connected to various devices constituting the waste heat recovery Rankine cycle system 30, for example the switching valve 23 and the cooling water valve 24 so as to switch the position of the switching valve 23 and open and close the cooling water valve 24.

In the waste heat recovery Rankine cycle system 30 constructed as the above, the second working medium used for driving the second scroll type fluid machine 10 is cooled by the second condenser 12. Namely, heat is supplied to the cooling water, which is supplied to the second condenser 12, by the heat exchange with the second working medium. When the heat demand from the external thermal instrument group 22 is smaller than the heat supply amount per unit time of the cooling water in the second condenser 12 in the case in which the flow rate F of the second working medium is the flow rate Fl, the control device 21 switches the switching valve 23 to the position Y and closes the cooling water valve 24 so as to supply the heated cooling water to the water supply passage 20. Accordingly, the heat can be supplied to the external thermal instrument group 22 without reducing the electric power generation amount by the second electric generator 11.

Figure 7:
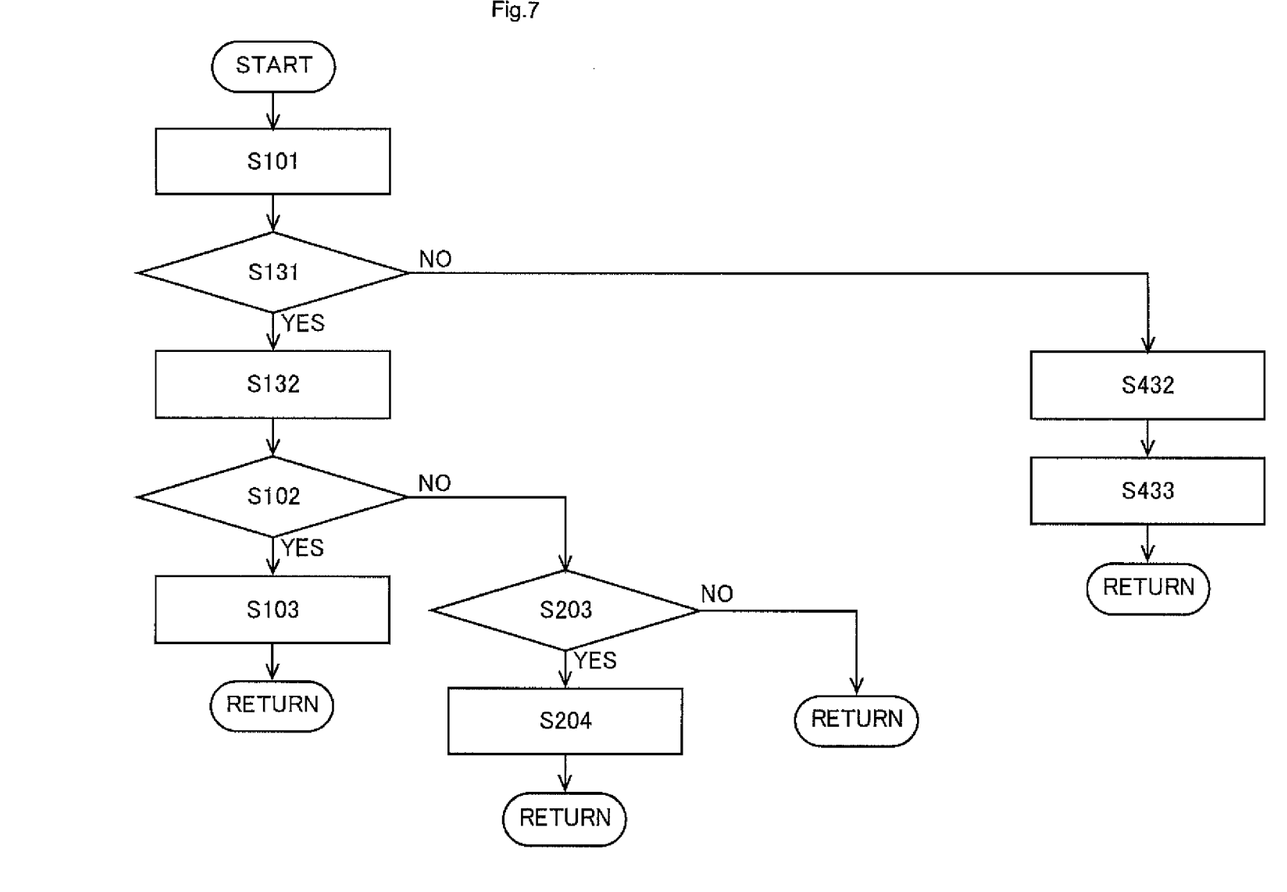
FIG. 7 is a flow chart of control steps of a second condensing pump of the waste heat recovery Rankine cycle system which is the second embodiment of the present invention.

An explanation will be given on an operation mode of the control device 21 of the waste heat recovery Rankine cycle system 30 configured as the above referring to FIG. 7.

Firstly, at a step S101, the control device 21 obtains the information about the heat demand from the external thermal instrument group 22 connected to the control device 21, the flow rate F of the second working medium determined from the driving state of the second condensing pump 14 and the opening degree of the flow rate regulation valve 17, and the position of the switching valve 23.

At a step S131, the control device 21 judges whether the heat demand from the external thermal instrument group 22 is larger than the heat supply amount per unit time from the second working medium to the cooling water in the case in which the flow rate F of the second working medium is the flow rate Fl.

As a result, when the heat demand from the external thermal instrument group 22 is judged larger than the heat supply amount per unit time from the second working medium to the cooling water in the case in which the flow rate F of the second working medium is the flow rate Fl, the control device 21 shifts the steps to a step S132.

On the other hand, when the heat demand from the external thermal instrument group 22 is judged not larger than the heat supply amount per unit time from the second working medium to the cooling water in the case in which the flow rate F of the second working medium is the flow rate Fl, the control device 21 shifts the steps to a step S432.

At the step S132, the control device 21 controls the switching valve 23 so as to open the water supply passage 20 and cut off the cooling water passage 19b from the water supply passage. Namely, the control device 21 controls the switching valve 23 to be at the position X so that the heated cooling water is not supplied to the water supply passage 20. In addition, the cooling water valve 24 is controlled not to be cut off. Subsequently, the control device 21 shifts the steps to a step S102.

At the step S432, the control device 21 controls the second condensing pump 14 so as to make the flow rate F of the second working medium the flow rate Fl. Namely, the control device 21 controls the second condensing pump 14 so as to make all the second working medium the vapor phase and supplies it to the second scroll type fluid machine 10. Subsequently, the control device 21 shifts the steps to a step S433.

At the step S433, the control device 21 controls the switching valve 23 so as to cut off the water supply passage 20 and communicate the cooling water passage 19b with the water supply passage 20. Namely, the control device 21 controls the switching valve 23 to be at the position Y so that the heated cooling water is supplied to the water supply passage 20. In addition, the cooling water valve 24 is controlled to be cut off. Subsequently, the control device 21 returns the steps to the step S101.

The steps S102 to S204 are the same as the embodiments explained above, and a concrete explanation thereof is omitted. The control device 21 returns the steps to the step S101.

As mentioned above, the waste heat recovery Rankine cycle system 30 further includes the second condenser 12 in which the second working medium discharged from the second scroll type fluid machine 10 which is the expander is condensed by the cooling water, and the switching valve 23 which changes the route of the cooling water so as to supply the cooling water instead of the feed water to the external thermal instrument group 22. When the amount of heat exchanged between the feed water and the second working medium per unit flow rate of the feed water is not more than the amount of heat exchanged between the cooling water and the second working medium per unit flow rate of the cooling water in the second condenser 12, the control device 21 switches the switching valve 23 so as to supply the cooling water to the external thermal instrument group 22.

According to the configuration, when the heat demand is small, all the second working medium can be supplied to the expander while heat is supplied to the external thermal instrument group 22 to which the feed water is supplied. Accordingly, the waste heat is collected efficiently as a mode corresponding to the heat demand.

INDUSTRIAL APPLICABILITY

The present invention can be used for a waste heat recovery Rankine cycle system including a first Rankine cycle operated with a first working medium and a second Rankine cycle operated with a second working medium having lower boiling point than the first working medium.

DESCRIPTION OF NOTATIONS 1 waste heat recovery Rankine cycle system
2 first Rankine cycle
3 second Rankine cycle
7 first condenser
14 second condensing pump
15 gas-liquid separation device
16 heat exchanger
17 flow rate regulation valve

The invention claimed is:

1. A waste heat recovery Rankine cycle system comprising:
   a first Rankine cycle operated with a first working medium; and
   a second Rankine cycle operated with a second working medium having lower boiling point than the first working medium,
   wherein
   the first Rankine cycle has a first condenser in which the first working medium is condensed by the second working medium and a first expander which drives a first generator,
   the second Rankine cycle has a condensing pump supplying the second working medium to the first condenser, a regulation valve changing a flow rate of the second working medium, and a gas-liquid separation device which separates the second working medium, heated in the first condenser, into a vapor phase and a liquid phase,
   the vapor phase of the second working medium is supplied to a second expander and the liquid phase of the second working medium is supplied to a heat exchanger, wherein the second expander drives a second generator,
   a control device is programmed to control such that:
   when an amount of heat exchanged between feed water supplied to the heat exchanger and the second working medium is increased, a driving state of the condensing pump and an opening degree of the regulation valve are controlled so as to increase a flow rate of the second working medium, and
   when the amount of heat exchanged between the feed water supplied to the heat exchanger and the second working medium is reduced, the driving state of the condensing pump and the opening degree of the regulation valve are controlled so as to reduce the flow rate of the second working medium.

2. The waste heat recovery Rankine cycle system according to claim 1, further comprising:
   a liquid level detection sensor configured to detect a liquid level which is a limit of separation of the vapor phase from the second working medium by the gas-liquid separation device,
   wherein the control device is configured such that, when the liquid level detection sensor detects the liquid level, the control device controls the driving state of the condensing pump and the opening degree of the regulation valve so as to increase the flow rate of the second working medium.

3. The waste heat recovery Rankine cycle system according to claim 1, further comprising:

a second condenser in which the second working medium discharged from the expander is condensed by a cooling water, and a switching valve which changes a route of the cooling water so as to supply the cooling water instead of the feed water to an instrument to which the feed water is supplied, wherein when an amount of heat exchanged between the feed water and the second working medium per unit flow rate of the feed water is not more than an amount of heat exchanged between the cooling water and the second working medium per unit flow rate of the cooling water in the second condenser, the control device is configured to switch the switching valve so as to supply the cooling water to the instrument to which the feed water is supplied.

* * * * *